(12) United States Patent
Hessler et al.

(10) Patent No.: US 10,985,792 B2
(45) Date of Patent: Apr. 20, 2021

(54) COMMON PHASE ERROR COMPENSATION

(71) Applicant: Telefonaktiebolaget LM Ericsson (publ), Stockholm (SE)

(72) Inventors: Martin Hessler, Linköping (SE); Johan Furuskog, Stockholm (SE); Lars Lindbom, Karlstad (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 258 days.

(21) Appl. No.: 16/090,879

(22) PCT Filed: Aug. 25, 2016

(86) PCT No.: PCT/SE2016/050802
§ 371 (c)(1),
(2) Date: Oct. 3, 2018

(87) PCT Pub. No.: WO2017/180036
PCT Pub. Date: Oct. 19, 2017

(65) Prior Publication Data
US 2020/0328768 A1 Oct. 15, 2020

Related U.S. Application Data

(60) Provisional application No. 62/321,369, filed on Apr. 12, 2016.

(51) Int. Cl.
*H04L 5/02* (2006.01)
*H04B 1/12* (2006.01)
*H04L 25/02* (2006.01)

(52) U.S. Cl.
CPC .............. *H04B 1/12* (2013.01); *H04L 5/026* (2013.01); *H04L 25/0226* (2013.01)

(58) Field of Classification Search
CPC ....... H04B 1/12; H04L 5/026; H04L 25/0226; H04L 27/2675; H04L 5/0051; H04J 2011/0016; H04J 13/0048
See application file for complete search history.

(56) References Cited

U.S. PATENT DOCUMENTS

2011/0142107 A1* 6/2011 Pan .................. H04B 7/0894
375/219
2011/0176517 A1 7/2011 Hu et al.
(Continued)

FOREIGN PATENT DOCUMENTS

WO 2014 070411 A1 5/2014

OTHER PUBLICATIONS

3GPP TSG RAN WG1 Meeting #83; Anaheim, USA; Source: LG Electronics; Title: Discussion on DMRS density and structure to handle high Doppler case (R1-157436)—Nov. 14-22, 2015.
(Continued)

*Primary Examiner* — Kenneth T Lam
(74) *Attorney, Agent, or Firm* — Patent Portfolio Builders, PLLC

(57) ABSTRACT

According to some embodiments, a method in a wireless receiver of compensating common phase error in a received wireless signal comprises receiving a first symbol of a wireless signal. The first symbol comprises a code division multiplexed demodulation reference signal (DM-RS) multiplexed with a length M orthogonal cover code, and a first code division multiplexed common phase error reference signal (CPE-RS) multiplexed with a length N orthogonal cover code, wherein N is less than or equal to M. The method further comprises determining M code points in the first symbol associated with a DM-RS; estimating a channel corresponding to the received wireless signal using the M code points associated with the DM-RS; estimating a first CPE-RS corresponding to the estimated channel using the
(Continued)

first N code points of the M code points associated with the DM-RS; and compensating the estimated channel for phase error using the estimated first CPE-RS.

18 Claims, 10 Drawing Sheets

(56) References Cited

U.S. PATENT DOCUMENTS

| | | | | |
|---|---|---|---|---|
| 2011/0274197 A1* | 11/2011 | Zhu | ................ | H04L 1/0031 |
| | | | | 375/267 |
| 2012/0188988 A1* | 7/2012 | Chung | ............. | H04L 5/0016 |
| | | | | 370/335 |
| 2012/0275414 A1* | 11/2012 | Hu | ................ | H04B 7/0452 |
| | | | | 370/329 |
| 2015/0029874 A1* | 1/2015 | Davydov | ......... | H04B 7/0452 |
| | | | | 370/252 |
| 2015/0358132 A1* | 12/2015 | Wallen | ............ | H04L 5/0048 |
| | | | | 370/329 |
| 2016/0043848 A1* | 2/2016 | Kim | ................ | H04L 5/0016 |
| | | | | 370/280 |
| 2017/0294926 A1* | 10/2017 | Islam | ............. | H04W 72/042 |
| 2018/0063820 A1* | 3/2018 | Xiong | ............ | H04W 72/042 |

OTHER PUBLICATIONS

PCT International Search Report for International application No. PCT/SE2016/050802—dated Nov. 28, 2016.

PCT Written Opinion of the International Searching Authority for International application No. PCT/SE2016/050802—dated Nov. 28, 2016.

European Office Action issued in corresponding EP Application No. 16766100.8 dated Aug. 5, 2020, 6 Pages.

* cited by examiner

COMMON PHASE ERROR COMPENSATION

PRIORITY

This nonprovisional application is a U.S. National Stage Filing under 35 U.S.C. § 371 of International Patent Application Serial No. PCT/SE2016/050802 filed Aug. 25, 2016, and entitled "COMMON PHASE ERROR COMPENSATION" which claims priority to U.S. Provisional Patent Application No. 62/321,369 filed Apr. 12, 2016, both of which are hereby incorporated by reference in their entirety.

TECHNICAL FIELD

Particular embodiments relate generally to error compensation in a wireless communication network, and more particularly to a common phase error reference signal.

BACKGROUND

Communications between a wireless transmitter and receiver generally require synchronization in time and/or frequency to facilitate reliable reception of messages. In cellular systems such as Third Generation Partnership Project (3GPP) long term evolution (LTE) or LTE New Radio (LTE NR, LTE-NX, or LTE 5G), base stations broadcast narrowband synchronization signals (PSS/SSS) regularly in time. From the synchronization signals, wireless devices accessing the system can perform an initial cell search (i.e., a synchronization procedure that includes finding carrier frequencies, time reference instants and cell identities).

An LTE device that has performed initial cell search and identified the cell identity can then complete the initial synchronization in downlink by making a fine synchronization on cell specific reference signals (CRS). CRS are transmitted over the system bandwidth more frequently in time than the synchronization signals. The device connects to the network via a random access procedure in which uplink time synchronization will be established and communications between the device and the base station can begin. Oscillator drifting at both transmitter and receiver sides may cause a wireless device to regularly perform fine frequency synchronization in downlink during communications with a base station.

LTE-NX includes a lean frame structure design without cell specific reference signals (CRS). Reference signals required for fine synchronization and demodulation of a downlink (DL) physical data channel (PDCH) are embedded into the PDCH transmission. An example of a PDCH downlink transmissions and its associated downlink control channel (PDCCH), carrying an assignment or a grant, is illustrated in FIG. 1.

FIG. 1 is a block diagram illustrating downlink transmissions of physical data channel and associated physical downlink control channel. Two radio subframes 10 each include four orthogonal frequency division multiplexed (OFDM) symbols 12. The first OFDM symbol 12 of each subframe 10 includes PDCCH 14 and the following OFDM symbols 12 include PDCHs 16. As illustrated in FIG. 1, transmissions of PDCH 16 may span over multiple subframes 10 using subframe aggregation (e.g., PDCH 16a) or be confined to one subframe 10 (e.g., PDCH 16b).

A wireless device (also referred to as user equipment (UE)) detects PDCCH addressed to the wireless device. From the scheduling information in the PDCCH, the wireless device derives PDCH related information. A UE is not aware of PDCCH transmissions to other UEs where a PDCCH to one particular user is carried on a subset of OFDM subcarriers. The mapping of PDCCH can either be distributed or localized. FIG. 1 illustrates the latter. The number of OFDM symbols within a subframe is a system design parameter and may be larger than the four subframes in the illustrated example.

PDCCH and PDCH include reference signals for demodulation, generally referred to as demodulation reference signals (DMRS), but other types of reference signals may be referred to herein. The DMRS is generally transmitted early in the subframe to enable the receiver to perform early channel estimation and thus reduce receiver processing.

LTE-NX performs time-synchronization using a first reference signal (e.g., Time Synchronization Signal (TSS)) and coarse-frequency-synchronization using the same first reference signal or a second signal (e.g., Frequency Synchronization Signal (FSS)). These signals generally do not provide highly accurate synchronization, either in time or in frequency. The time-error may be handled by the cyclic-prefix in an OFDM system, and the frequency error may be handled through sufficient sub-carrier spacing. However, to prevent limiting the performance of higher rank transmissions of PDCH in conjunction with higher modulation schemes (such as 64 and 256 QAM), improved frequency-synchronization is needed. Conventional solutions (e.g., as in LTE) use demodulation reference signals for this purpose (e.g., DMRS or CRS).

In a 5G system deployment at higher carrier frequencies, the radio link exhibits some new properties compared to, for example, an LTE system deployed at lower carrier frequencies. One new property is that the common phase error scales with the carrier frequency, which introduces a need for a phase reference signal to mitigate a phase error that is common for all subcarriers within an OFDM symbol. Such a reference signal may be used both in uplink and downlink, and may be used for both fine carrier frequency-synchronization and for common phase error compensation. An example of a common phase error reference signal (CPE-RS) is illustrated in FIG. 2.

FIG. 2 illustrates example time-frequency grids containing common phase error reference signals (CPE-RS) and demodulation reference signals (DM-RS). Each grid comprises time/frequency resources 22. The horizontal axis represents time and the vertical axis represents frequency. Each grid includes DM-RS 24 and CPE-RS 26.

In the illustrated example, CPE-RS 26 is transmitted time continuously and a length-8 cover code is used to create 8 orthogonal DM-RS 24 resources. DM-RS 24 resources may be enumerated 0-7 and may refer to 8 DM-RS ports. In this particular example, four CPE-RS 26 are allocated to support tracking of common phase errors originating from four different transmitters (e.g., CPE-RS 0, 1, 2, 3).

CPE-RS 26 is transmitted jointly with DM-RS 24 (and thus with the data channel PDCH) on a subset of the subcarriers allocated for DM-RS 24. DM-RS 24 may be transmitted in one (or a few) OFDM symbols early within a subframe, or within a subframe aggregation, whereas CPE-RS 26 may be transmitted in every OFDM symbol. The density of the DM-RS in the frequency domain (i.e., the set of subcarriers occupied by DM-RS 24) is significantly higher than the corresponding density of CPE-RS 26. In contrast, for radio channels that are often non-flat over the transmission bandwidth, the phase ambiguity caused by the common phase error will impact all subcarriers in a similar way. A reason to transmit CPE-RS on more than one subcarrier is to obtain frequency diversity or increase the processing gain.

Multi-layer transmission of PDCH uses a set of orthogonal DM-RS constructed via frequency division multiplexing (FDM) (e.g., interleaved FDM, also referred to as combs in LTE), via code division multiplexing (CDM), or via a combination of both. CDM may refer to orthogonal cover codes (OCC) based on, for example, Walsh-Hadamard codes, Discrete Fourier Transform (DFT) codes, or any other schemes that provide orthogonality in the code domain. In LTE, OCC in time domain is used to create set of orthogonal DM-RS, but OCC in time domain might be less suitable when common phase errors need to be continuously tracked within a subframe. DM-RS needs to be transmitted in at least two OFDM symbols in order to apply OCC in time, which may not always be the case in NX. Therefore, NX deployments with excessive common phase errors may construct a set of orthogonal DM-RS, for example, in the frequency domain via combs and/or CDM.

LTE-NX may also use OFDM for uplink where it is beneficial to time-multiplex DM-RS of low cubic metric with PDCH uplink transmissions for enabling power boosting on the DM-RS and improving the channel estimation for coverage limited users. With such time division multiplexed (TDM) design of PDCH and DM-RS, no data is mapped to subcarriers within the third OFDM symbol in FIG. 1. All subcarriers may be used for DM-RS transmissions. However, subcarriers blocked by CPE-RS can limit the maximum number of available DM-RS layers.

The approaches described thus far include particular disadvantages. For example, in traditional synchronized radio systems some downlink signals are always present (e.g., PSS/SSS/CRS in LTE) enabling the UE to keep track of the time-frequency synchronization to a base station without communication with the network. Such design simplifies the time-frequency synchronization at the expense of poor energy performance and constant interference from the always-on signals.

Lean system design that removes the always-on signals is one alternative. However, a consequence of removing always-on signals, such as CRS, is that tracking and fine adjustments of the time-frequency synchronization become more complicated. Relying on DM-RS for time-frequency synchronization creates large overhead by using a large fraction of the spectrum for synchronization at the cost of decreased data rates. For example, using DM-RS for tracking common phase errors is inefficient as the needed time-density is high for accurate common phase error tracking. The DM-RS design takes frequency selectivity into account, which means that the resource density in frequency is high for demodulation performance. Thus, using the same reference signal for both demodulation and common phase error tracking results in excessively high overhead.

A common phase error reference signal (CPE-RS) may be used for tracking common phase errors. However, this creates a problem when subcarriers used for common phase error tracking are blocked (intersected) by OFDM symbols used for DM-RS, which also contain the common phase error and need a phase error reference.

The alternatives described in the Background section are not necessarily alternatives that have been previously conceived or pursued. Therefore, unless otherwise indicated herein, the alternatives described in the Background section are not prior art to the claims in this application and are not admitted to be prior art by inclusion in the Background section.

SUMMARY

In the embodiments described herein, a wireless transmitter, such as a base station or a wireless device, generates a common phase error reference signal (CPE-RS) from the effective transmitted demodulation reference signal (DMRS) by using an orthogonal cover code (OCC) structure to facilitate code multiplexing of CPE-RS. The symbols transmitted in the intersection of the CPE-RS and DMRS (effective over all transmission layers) correspond to a first part of the OCC, referred to as CPE-OCC, and are copied to all other resource elements assigned to CPE-RS. A wireless receiver, such as a base station or a wireless device, determines a CPE-RS OCC length and extracts all unique CPE-RS OCC code points in a first OFDM signal. The receiver performs channel estimates for all DMRS and extracts common phase error references for all the unique CPE-RS code points. In a second OFDM symbol, the wireless receiver again extracts common phase error references for all unique CPE-RS OCC code points and performs separate phase error compensation of the channel estimates.

According to some embodiments, a method in a wireless receiver of compensating common phase error in a received wireless signal comprises receiving a first symbol of a wireless signal. The first symbol comprises a code division multiplexed demodulation reference signal (DM-RS) multiplexed with a length M orthogonal cover code, and a first code division multiplexed common phase error reference signal (CPE-RS) multiplexed with a length N orthogonal cover code, wherein N is less than or equal to M. The method further comprises determining M code points in the first symbol associated with a DM-RS; estimating a channel corresponding to the received wireless signal using the M code points associated with the DM-RS; estimating a first CPE-RS corresponding to the estimated channel using the first N code points of the M code points associated with the DM-RS; and compensating the estimated channel for phase error using the estimated first CPE-RS.

In particular embodiments, the method further comprises obtaining a value of the length N. Obtaining the value of the length N may comprise receiving the length N value in downlink control information (DCI).

In particular embodiments, the first symbol comprises an orthogonal frequency division multiplexed (OFDM) symbol. The orthogonal cover code may comprise one of a Walsh-Hadamard code or a Discrete Fourier Transform (DFT) code. The wireless receiver may comprise a long term evolution 5G wireless device or a long term evolution 5G network node.

In particular embodiments, the method further comprises receiving a second symbol of the wireless signal. The second symbol comprises a second code division multiplexed common CPE-RS multiplexed with the length N orthogonal cover code. The method further comprises determining resource elements in the second symbol corresponding to resource elements in the first symbol comprising the first N code points of the M code points associated with the DM-RS; estimating a second CPE-RS corresponding to the estimated channel using the determined resource elements in the second symbol; and compensating the estimated channel for phase error using the estimated second CPE-RS.

According to some embodiments, a method in a wireless transmitter of transmitting a common phase error reference signal comprises determining a code division multiplexed common CPE-RS multiplexed with a length N orthogonal cover code and comprising N code points, and determining a code division multiplexed demodulation reference signal (DM-RS) multiplexed with a length M orthogonal cover code and comprising M code points. M is greater than or equal to N and a first N code points of the DM-RS are generated from the CPE-RS. The method further comprises transmitting a first symbol of a radio frame comprising the code division multiplexed CPE-RS and the code division multiplexed DM-RS to a wireless receiver.

In particular embodiments, the method further comprises transmitting a value of the length N to the wireless receiver. Transmitting the value of the length N may comprise transmitting the value in downlink control information (DCI).

In particular embodiments, the first symbol comprises an OFDM symbol. The orthogonal cover code may comprise one of a Walsh-Hadamard code or a Discrete Fourier Transform (DFT) code. The wireless transmitter may comprise a long term evolution 5G wireless device or a long term evolution 5G network node In particular embodiments, the method further comprises copying the code division multiplexed CPE-RS to a second symbol of the radio frame; and transmitting the second symbol of the radio frame to the wireless receiver.

Also disclosed is a computer program product. The computer program product comprises instructions stored on non-transient computer-readable media which, when executed by a processor, performs the act of receiving a first symbol of a wireless signal. The first symbol comprises a code division multiplexed demodulation reference signal (DM-RS) multiplexed with a length M orthogonal cover code, and a first code division multiplexed common phase error reference signal (CPE-RS) multiplexed with a length N orthogonal cover code, wherein N is less than or equal to M. The instructions further perform the acts of determining M code points in the first symbol associated with a DM-RS; estimating a channel corresponding to the received wireless signal using the M code points associated with the DM-RS; estimating a first CPE-RS corresponding to the estimated channel using the first N code points of the M code points associated with the DM-RS; and compensating the estimated channel for phase error using the estimated first CPE-RS.

In another computer program product, the computer program product comprises instructions stored on non-transient computer-readable media which, when executed by a processor, performs the acts of determining a code division multiplexed common CPE-RS multiplexed with a length N orthogonal cover code and comprising N code points, and determining a code division multiplexed demodulation reference signal (DM-RS) multiplexed with a length M orthogonal cover code and comprising M code points. M is greater than or equal to N and a first N code points of the DM-RS are generated from the CPE-RS. The instructions further perform the act of transmitting a first symbol of a radio frame comprising the code division multiplexed CPE-RS and the code division multiplexed DM-RS to a wireless receiver.

Particular embodiments may exhibit some of the following technical advantages. Particular embodiments may improve CPE-RS resource utilization compared to conventional solutions. Full utilization of all sub-carriers is possible for DMRS while utilizing code-domain for the CPE-RS extraction. This improves processing gain for CPE tracking without the need for power boosting solutions (which are needed in conventional solutions to improve coverage). Thus, in particular embodiments the allocation of CPE-RS may not limit the maximum number of available DM-RS layers.

Another advantage is improved support for extended common phase noise tracking in multi-user multiple-input multiple-output (MU-MIMO) operations and in coordinated multipoint (CoMP) deployments with multiple transmission points. Furthermore, particular embodiments use marginal additional signaling for configuring CPE-RS. Particular embodiments facilitate a flexible configuration of a longer length DMRS-OCC and a shorter length CPE-OCC at the same time. Other technical advantages will be readily apparent to one skilled in the art from the following figures, description and claims.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

Conventional synchronized radio systems include downlink signals that are always present (e.g., PSS/SSS/CRS in LTE) enabling the UE to keep track of the time-frequency synchronization to a base station without communication with the network. Such design simplifies the time-frequency synchronization at the expense of poor energy performance and constant interference from the always-on signals.

Lean system design that removes the always-on signals is one alternative. However, a consequence of removing always-on signals, such as CRS, is that tracking and fine adjustments of the time-frequency synchronization become more complicated. Relying on DM-RS for time-frequency synchronization creates large overhead by using a large fraction of the spectrum for synchronization at the cost of decreased data rates. For example, using DM-RS for tracking common phase errors is inefficient as the needed time-density is high for accurate common phase error tracking. The DM-RS design takes frequency selectivity into account, which means that the resource density in frequency is high for demodulation performance. Thus, using the same reference signal for both demodulation and common phase error tracking results in excessively high overhead.

A common phase error reference signal (CPE-RS) may be used for tracking common phase errors. However, this creates a problem when subcarriers used for common phase error tracking are blocked (intersected) by OFDM symbols used for DM-RS, which also contain the common phase error and need a phase error reference.

An object of the present disclosure is to obviate at least the disadvantages above and provide a CPE-RS generated from the effective transmitted DM-RS by using an orthogonal cover code structure to facilitate code multiplexing of CPE-RS. The symbols transmitted in the intersection of the CPE-RS and DMRS (effective over all transmission layers) correspond to a first part of the OCC, referred to as CPE-OCC, and are copied to all other resource elements assigned to CPE-RS. A wireless receiver, such as a base station or a wireless device, determines a CPE-RS OCC length and extracts all unique CPE-RS OCC code points in a first OFDM signal. The receiver performs channel estimates for all DMRS and extracts common phase error references for all the unique CPE-RS code points. In a second OFDM symbol, the wireless receiver again extracts common phase error references for all unique CPE-RS OCC code points and performs separate phase error compensation of the channel estimates.

Particular embodiments are described with reference to FIGS. 1-10B of the drawings, like numerals being used for like and corresponding parts of the various drawings. LTE is used throughout this disclosure as an example cellular system, but the ideas presented herein apply to other wireless communication systems as well.

Figure 3:
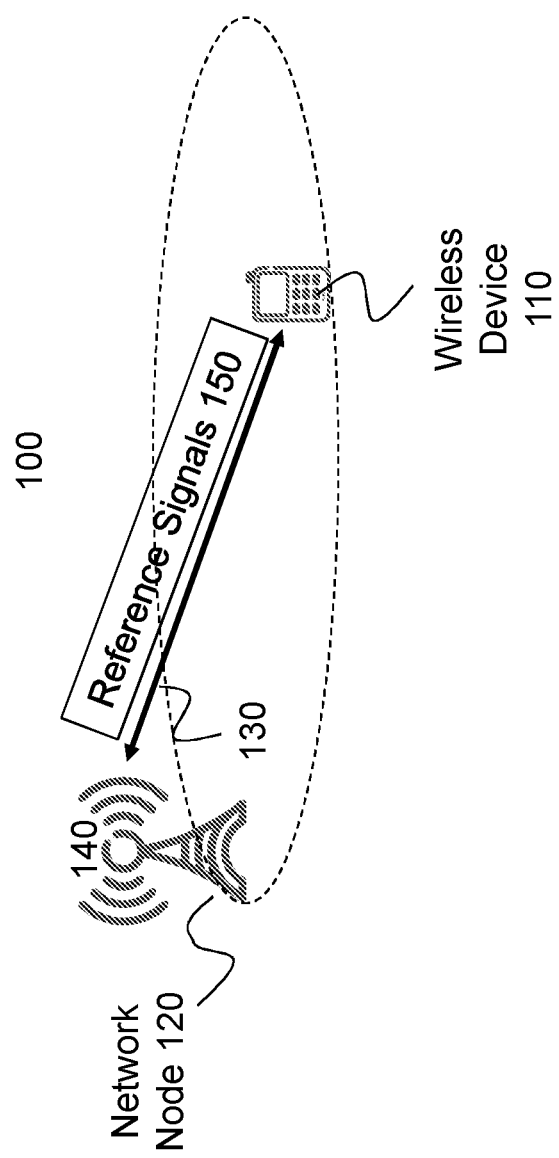
FIG. 3 is a block diagram illustrating an example wireless network, according some embodiments.

FIG. 3 is a block diagram illustrating an example of a network, according to a particular embodiment. Network 100 includes network node 120 (such as a base station or eNodeB) and wireless devices 110 (such as mobile phones, smart phones, laptop computers, tablet computers, or any other devices that can provide wireless communication). In general, wireless devices 110 that are within coverage of network node 120 communicate with network node 120 by transmitting and receiving wireless signals 130. For example, wireless devices 110 and network node 120 may communicate wireless signals 130 containing voice traffic, data traffic, and/or control signals. Wireless signals 130 may include both downlink transmissions (from network node 120 to wireless devices 110) and uplink transmissions (from wireless devices 110 to network node 120).

Wireless signals 130 may include reference signals 150, such as DM-RS and CPE-RS. Wireless device 110 may use the reference signals to determine synchronization and error correction information for wireless signal 130 in the downlink. In particular embodiments, wireless device 110 may transmit reference signals, such as DM-RS and CPE-RS, in the uplink. Network node 120 may use the reference signals to determine synchronization and error correction information for wireless signal 130 in the uplink.

Figure 1:
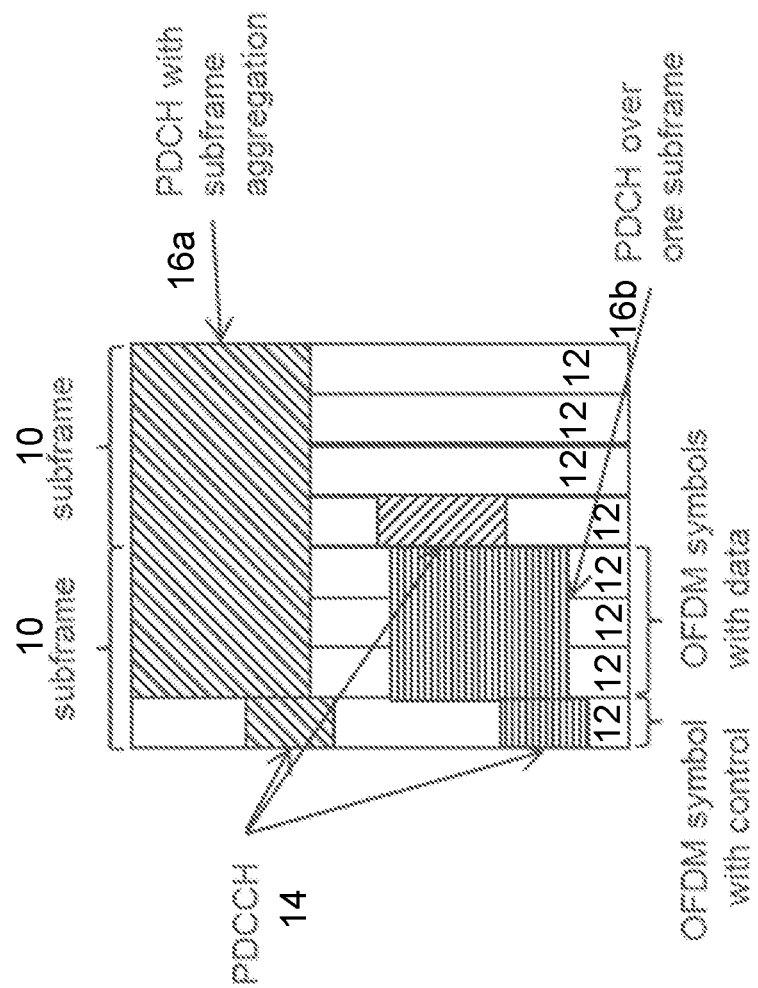
FIG. 1 is a block diagram illustrating downlink transmissions of physical data channel (PDCH) and associated physical downlink control channel (PDCCH)
Figure 2:
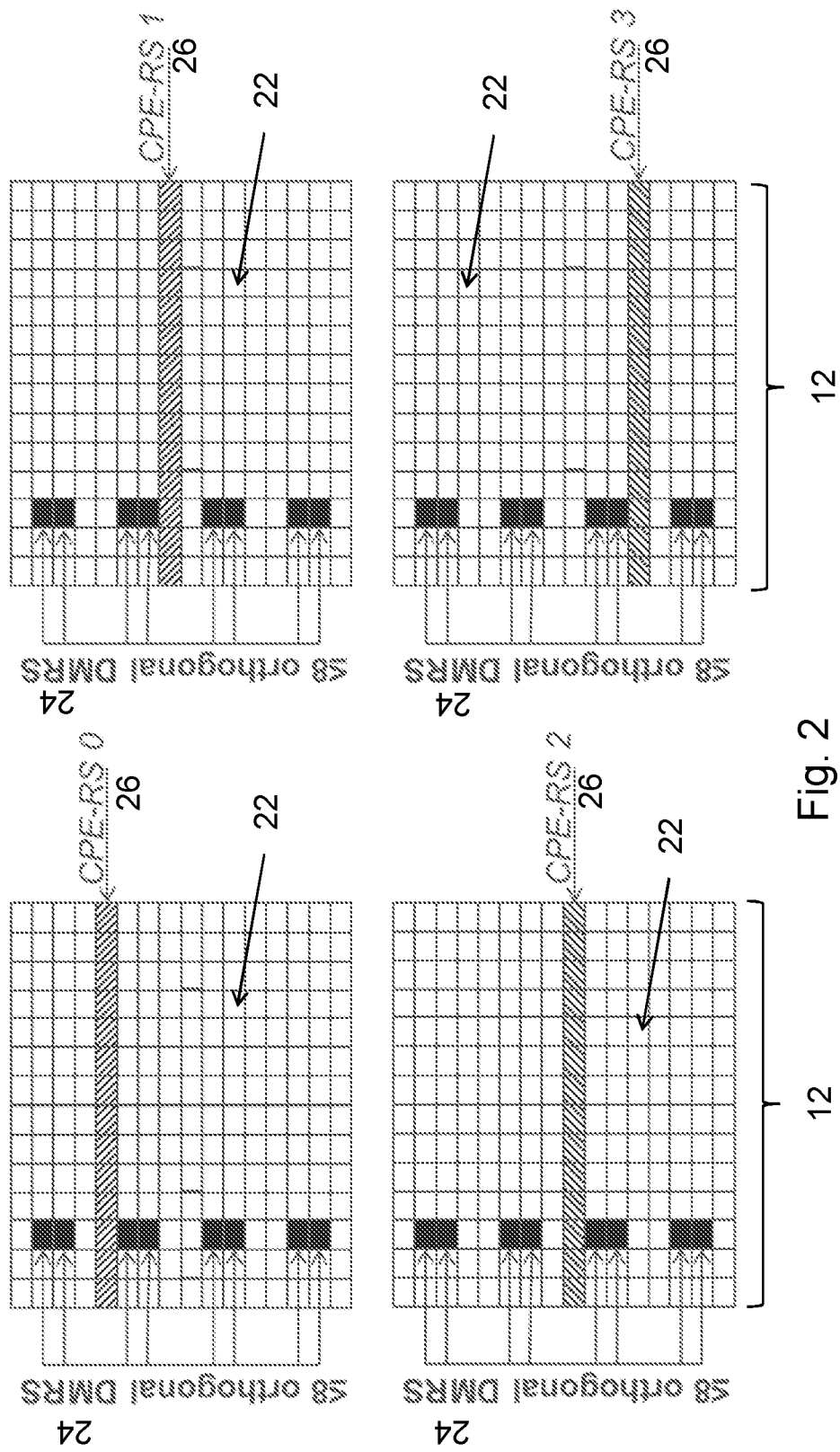
FIG. 2 illustrates example time-frequency grids containing common phase error reference signals (CPE-RS) and demodulation reference signals (DM-RS)
Figure 4:
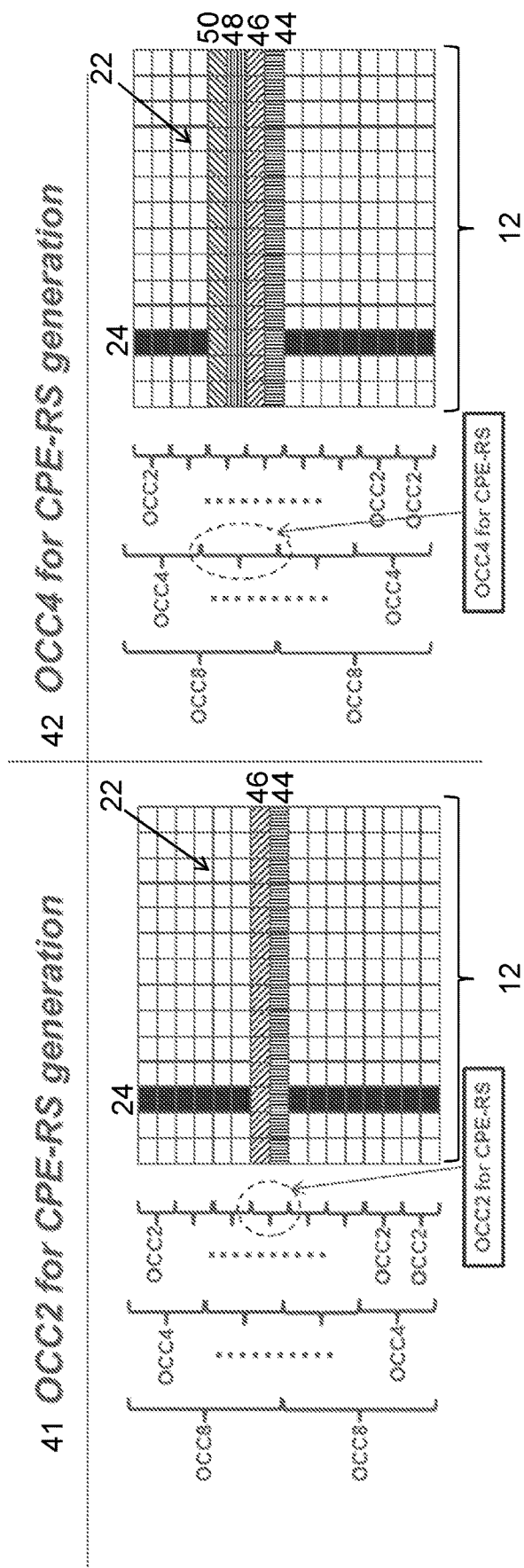
FIG. 4 illustrates example time-frequency grids with copied demodulation reference signal (DM-RS) from node specific common phase error orthogonal cover code (CPE-OCC) for common phase error tracking, according to some embodiments.
Figure 5:
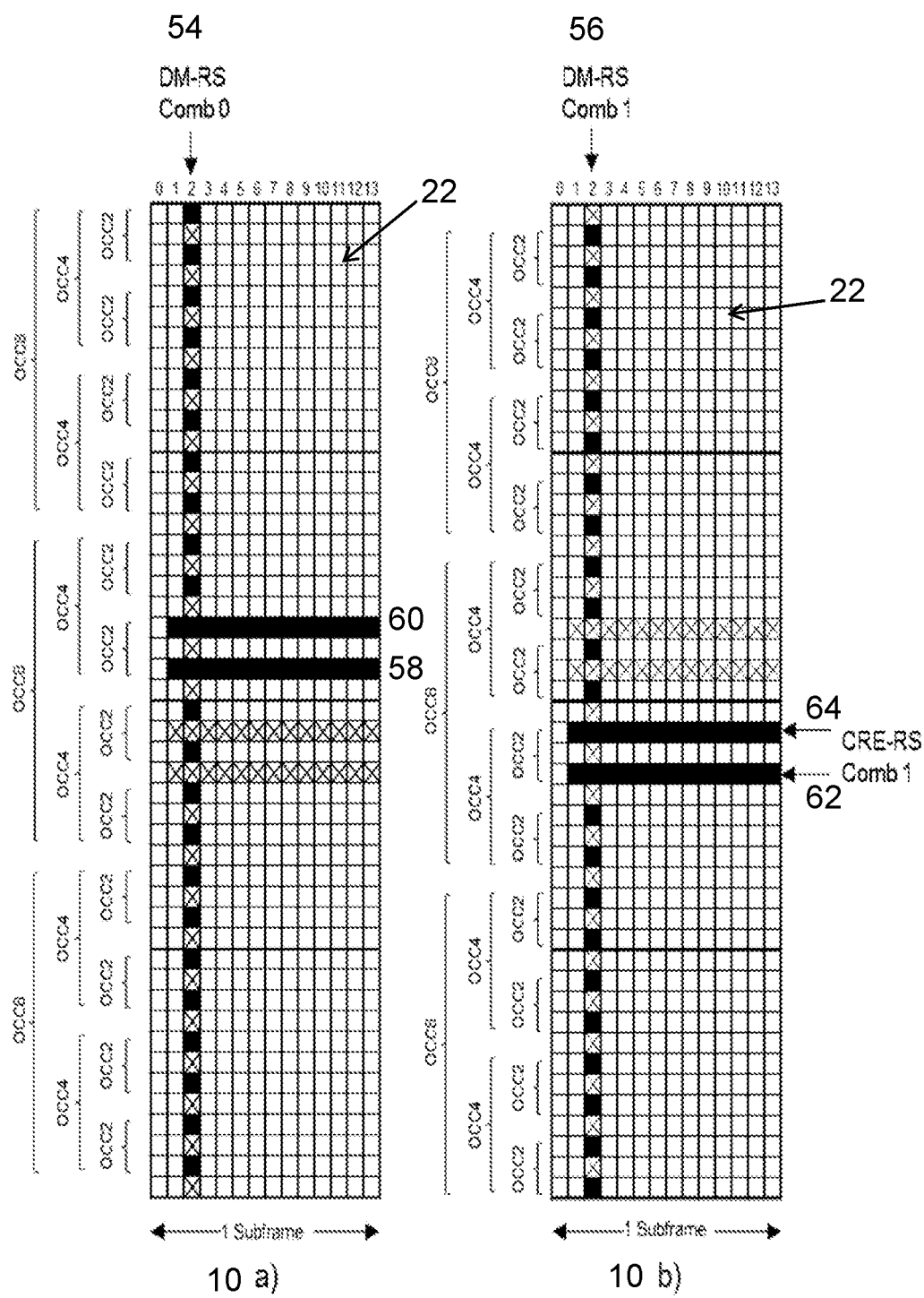
FIG. 5 illustrates example time-frequency grids with DM-RS and CPE-RS using two combs in the frequency domain, according to particular embodiments.
Figure 6:
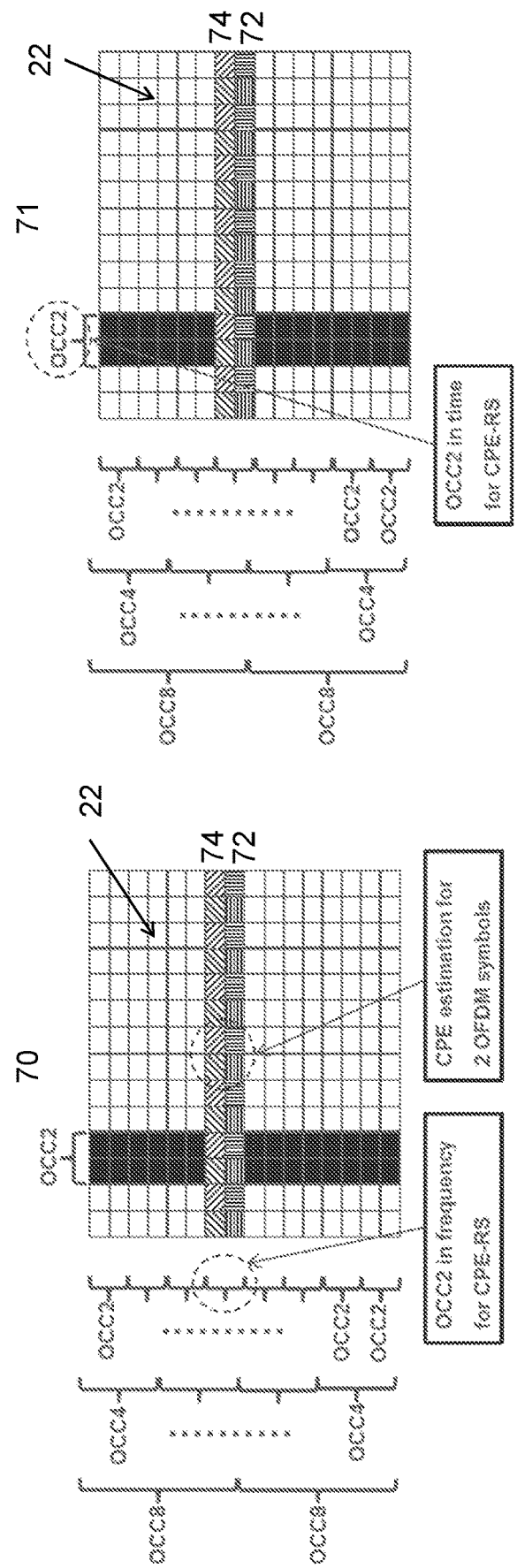
FIG. 6 illustrates example time-frequency grids with DM-RS and CPE-RS using time domain mapping of orthogonal cover codes, according to particular embodiments.

Wireless signals 130 comprise radio frames which in turn comprise time/frequency resources, such as time/frequency resources 22 illustrated in FIG. 2 described above. Particular example time/frequency formats for reference signals 150 are illustrated in FIGS. 4-6 described below.

Network node 120 transmits and receives wireless signals 130 using antenna 140. In particular embodiments, network node 120 may comprise multiple antennas 140. For example, network node 120 may comprise a multi-input multi-output (MIMO) system with two, four, eight, or more antennas 140.

In network 100, each network node 120 may use any suitable radio access technology, such as long term evolution (LTE), LTE-Advanced, LTE-NX, 4G, 5G, UMTS, HSPA, GSM, cdma2000, WiMax, WiFi, and/or other suitable radio access technology. Network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a network may include one or more wireless devices and one or more different types of network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 9A below. Similarly, a network node may include any suitable combination of hardware and/or software. For example, in particular embodiments, a network node, such as network node 120, may include the components described with respect to FIG. 10A below.

Particular embodiments include a method in a wireless receiver, such as wireless device 110 (i.e., downlink) or network node 120 (i.e., uplink), for tracking common phase error using a code division multiplexed common phase error tracking reference signal. The receiver determines a CPE-RS OCC length and extracts all unique CPE-RS OCC code points in a first OFDM symbol. Further, the receiver performs first channel estimates on all DM-RS and extracts common phase error references for all of the unique CPE-RS code points. In a second OFDM symbol, the receiver extracts a second set of common phase errors references for all of the unique code points. The receiver performs separate common phase error compensation of the channel estimates using the set of unique CPE-RS OCC code points.

Particular embodiments include a method in a wireless transmitter, such as network node 120 (i.e., downlink) or wireless device 110 (i.e., uplink), for generating code division multiplexed reference signals for common phase error tracking. The transmitter determines a CPE-OCC length and code points for CPE-RS generation to intended receivers. Further, the transmitter generates one or more DM-RS OCC of equal or longer length than the CPE-OCC length and determines signals for CPE-RS sub-carriers. The transmitter copies the determined signals to all CPE-RS sub-carriers for all OFDM symbols carrying CPE-RS. The transmitter then transmits data with the DM-RS and the CPE-RS.

Generally, a wireless transmitter generates a CPE-RS from the effective transmitted DM-RS by using an orthogonal cover code (OCC) structure to facilitate code multiplexing of CPE-RS. The symbols transmitted in the intersection of the CPE-RS and DMRS (effective over all transmission layers) correspond to a first part of the OCC, referred to as CPE-OCC, and are copied to all other resource elements assigned to CPE-RS. An example is illustrated in FIG. 4.

FIG. 4 illustrates example time-frequency grids with copied demodulation DM-RS from node specific CPE-OCC for common phase error tracking, according to some embodiments. Grids 41 and 42 each comprise time/frequency resources 22. The horizontal axis represents time and the vertical axis represents frequency. Each grid includes DM-RS 24.

Grid 41 represents CPE-RS generation using an OCC of length 2. Grid 41 includes two CPE-RS, CPE-RS 44 and 46, each generated from one of the OCC code points. Each of the time/frequency resources 22 assigned to CPE-RS 44 is a copy of the time/frequency resource 22 at the intersection of DM-RS 24 and CPE-RS 44. Similarly, each of the time/frequency resources 22 assigned to CPE-RS 46 is a copy of the time/frequency resource 22 at the intersection of DM-RS 24 and CPE-RS 46. Although CPE-RS and DM-RS are illustrated using particular time/frequency resources 22, in other embodiments CPE-RS and DM-RS may use any suitable time/frequency resources 22.

Grid 42 represents CPE-RS generation using an OCC of length 4. Grid 42 includes four CPE-RS, CPE-RS 44, 46, 48, and 50, each generated from one of the OCC code points. Each of the time/frequency resources 22 assigned to CPE-RS 44 is a copy of the time/frequency resource 22 at the intersection of DM-RS 24 and CPE-RS 44. Similarly, each of the time/frequency resources 22 assigned to CPE-RS 46, 48, and 50 is a copy of the time/frequency resource 22 at the intersection of DM-RS 24 and CPE-RS 46, 48, and 50, respectively. Although CPE-RS and DM-RS are illustrated using particular time/frequency resources 22, in other embodiments CPE-RS and DM-RS may use any suitable time/frequency resources 22.

In some embodiments, the DM-RS signal is copied as the effective complex value transmitted in the resource element intersecting with the CPE-RS. The receiver determines that the CPE-RS signal is known from the intersecting DM-RS signal and copies it to corresponding subcarriers of the other OFDM symbols carrying CPE-RS.

Particular embodiments may support common phase error tracking from two network nodes. A length-2 CPE-OCC may be used where, for example, one of the network nodes (BS0) uses the CPE-OCC code point [1,1] (assuming Walsh-Hadamard) and the other network node (BS1) uses the CPE-OCC code point [1,−1].

Using the node specific CPE-OCC structure, common phase errors can be extracted even if longer DM-RS-OCC is used for wireless devices served by BS0 and BS1. For example, BS0 may use all OCC4 code points generated from CPE-OCC [1,1] (i.e., DMRS-OCC [1,1,1,1] and [1,1,−1,−1]), and BS1 may use all OCC4 generated from CPE-OCC [1,−1] (i.e., DMRS-OCC [1,−1,1,−1] and [1,−1,−1,1]).

Similarly, code division multiplexing of CPE-RS may be used to compensate for phase error from multiple wireless devices. For example, a length-4 CPE-OCC may support common phase noise tracking in MU-MIMO of four wireless devices (UE0, UE1, UE2, UE3) in uplink where UE0 uses CPE-OCC [1,1,1,1], UE1 use [1,−1,1,−1], etc. In this example, UE0 may use both available OCC8 code points for DMRS-OCC (i.e., [1,1,1,1,1,1,1,1] and [1,1,1,1,−1,−1,−1,−1] for DM-RS).

Particular embodiments describe transmission from one or more transmitters affected by common phase errors to a single receiver. For multiple receivers, the same procedures may be used with each receiver.

Some embodiments include signaling and configuration for CPR-RS. For example, a wireless device may receive signaling to configure it how to extract CPE-RS and which CPE estimate is associated with a particular layer which in turn corresponds to a particular DM-RS.

In particular embodiments, each transmitter may be configured with a CPE-OCC for CPE-RS generation and each receiver may be configured with a CPE-OCC length for CPE-RS extraction. Each CPE-OCC length may be associated with the same number of sub-carriers for the mapping of the CPE-RS. For example, a network node may control two transmitters that have independent common phase errors but are otherwise synchronized. The two transmitters may, for example, refer to two antenna panels in the same position but with separate VCOs and PAs, etc. Each of the panels may use two generated sub-sets of DM-RS and send CPE-RS using only their set of DM-RS, including relevant precoding.

As a particular example, a first network node (BS0) may generate CPE-RS using CPE-OCC [1,1] and use DM-RS derived from this CPE-OCC. In the receiver, the wireless device may be configured with OCC2 for CPE-RS and may extract the relation between DM-RS and CPE-RS. For example, if the wireless device is assigned DM-RS [1,1], [1,−1,1,−1], and [1,−1,−1,1], it can derive that both [1,1] and [1,−1] are used for CPE-RS extraction and that DM-RS [1,1] should use the [1,1] CPE-OCC and that the CPE-RS extracted from [1,−1] CPE-OCC should be used both for [1,−1,1,−1] and [1,−1,−1,1]. Prior to extraction of the data symbols in a later OFDM-symbol, the obtained CPE estimate from [1,1] CPE-OCC may be used to compensate the channel estimate derived from [1,1] DM-RS, and the CPE estimate derived from [1,−1] CPE-OCC may be used to compensate the channel estimates from the two later DM-RSs. The configuration and signaling can be dynamic (i.e., the CPE-RS OCC length is included in the DCI) or in a semi-static fashion (i.e., using higher layer signaling).

Some embodiments use frequency combs. In particular embodiments, the DM-RS may be generated using OCC within a comb structure. The comb structure may separate multiple common phase errors via CPE-RS both in the frequency domain and in the code domain. For example, if two combs are used together with OCC2, then two CPE-RS may be generated from the combs. The additional CPE-RS are generated using the same procedure described above. An example is illustrated in FIG. 5.

FIG. 5 illustrates example time-frequency grids with DM-RS and CPE-RS using two combs in the frequency domain, according to particular embodiments. Subframes 10a and 10b each comprise 14 OFDM symbols comprising time/frequency resources 22. DM-RS is transmitted on two combs, combs 54 and 56. A length-2 CPE-OCC is used per comb for CPE tracking of common phase errors originating from potentially four independent transmissions (e.g., a MU-MIMO uplink scenario with four UEs).

CPE-RS 58 and 60 and the DM-RS of comb 54 comprise particular time/frequency resources 22. CPE-RS 62 and 64 and the DM-RS of comb 56 comprise different time/frequency resources than those of comb 54. Time/frequency resources 22 marked with an X in comb 54 are the time/frequency resources 22 used for DM-RS and CPE-RS in comb 56, and vice versa.

Other embodiments may use different OCC lengths for CPE-RS generation on the two combs (e.g., OCC2 on one comb and no code orthogonality on the other comb). One comb may use the code division multiplexed embodiments disclosed herein and the other comb may use an alternative or conventional solution without code multiplexing of CPE-RS.

Some embodiments may use joint CPE processing over multiple CPE-OCC. Improved processing gain and better diversity on the CPE-RS may be achieved by using multiple code points for CPE-OCC. For example, by configuring a wireless device to associate both CPE-OCC [1,1] and [1,−1] with the same transmitter, the CPE estimate for both code-points can be processed jointly. This enables the network node to transmit CPE-RS in two "beams" with spatial diversity.

Some embodiments may use OCC in time, or may use OCC in both time and frequency together. In the embodiments described above, OCC is applied in the frequency domain. Other embodiments apply OCC in time domain. For the time domain, the CPE estimation is limited to the length of the OCC mapping in time. For example, if two OFDM symbols are used, then the CPE compensation is performed over 2 OFDM symbols. An example is illustrated in FIG. 6.

FIG. 6 illustrates example time-frequency grids with DM-RS and CPE-RS using time domain mapping of orthogonal cover codes, according to particular embodiments. Grids 70 and 71 each comprise time/frequency resources 22. The horizontal axis represents time and the vertical axis represents frequency. Grid 71 illustrates the same pattern of DM-RS and CPE-RS using timing domain mapping of orthogonal cover codes as grid 70. As illustrated in grids 70 and 71, the DM-RS is multiplexed in time using a length-2 OCC. Grids 71 and 72 include CPE-RS 72 and 74 multiplexed in frequency using a length-2 OCC.

Each of the time/frequency resources 22 assigned to CPE-RS 72 is a copy of the pair of time/frequency resources 22 at the intersection of the DM-RS and CPE-RS 72. Similarly, each of the time/frequency resources 22 assigned to CPE-RS 74 is a copy of the pair of time/frequency resources 22 at the intersection of the DM-RS and CPE-RS 74. The CPE estimation is performed over 2 OFDM symbols. Although CPE-RS and DM-RS are illustrated using particular time/frequency resources 22, in other embodiments CPE-RS and DM-RS may use any suitable time/frequency resources 22. Particular embodiments may use a combination of OCC in frequency and time applied to the CPE-RS.

Figure 7:
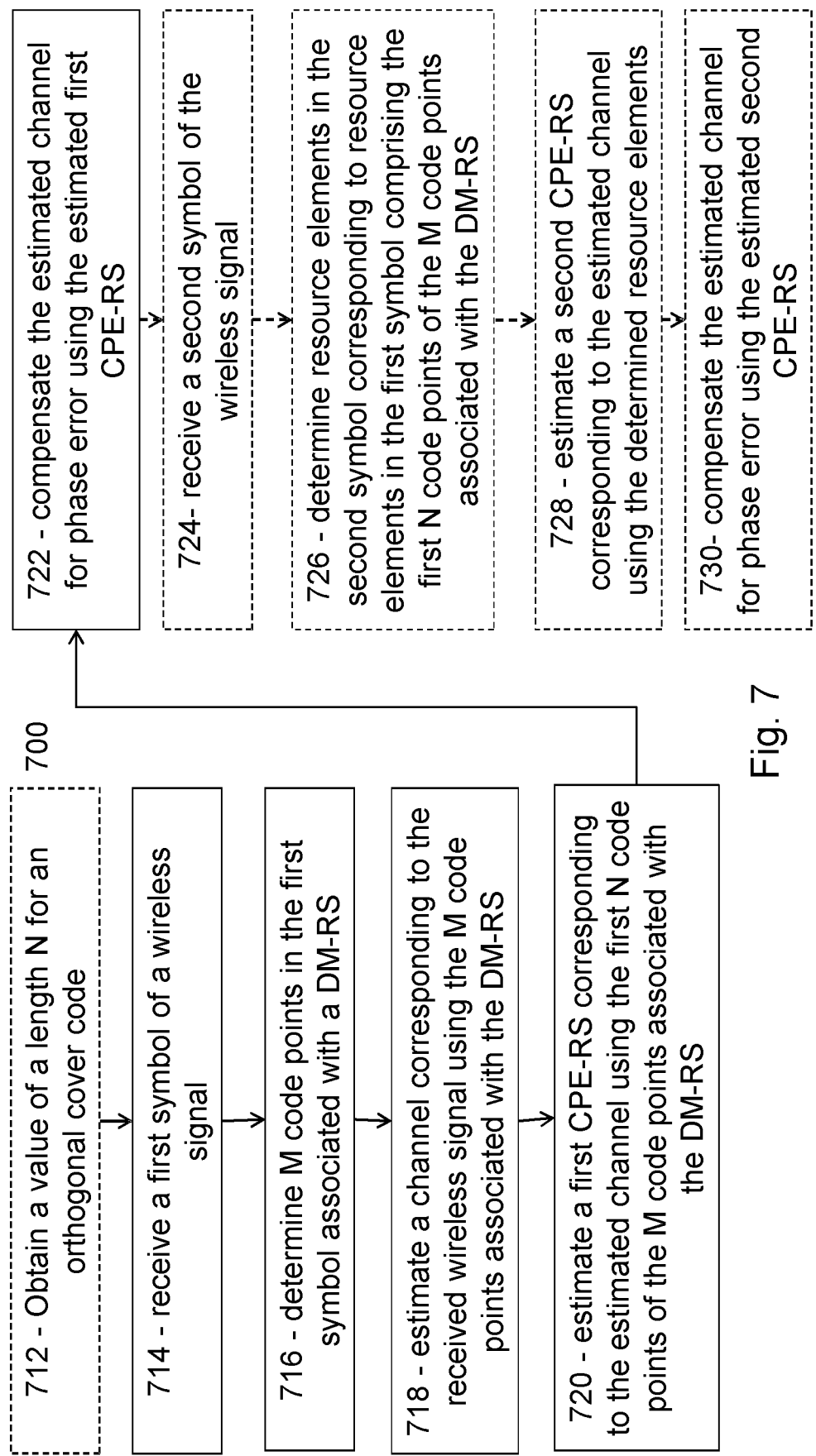
FIG. 7 is a flowchart of an example method in a wireless receiver of compensating common phase error in a received wireless signal, according to some embodiments.

FIG. 7 is a flowchart of an example method in a wireless receiver of compensating common phase error in a received wireless signal, according to some embodiments. In particular embodiments, one or more steps of the method may be performed by components of network 100 described with reference to FIG. 3.

The method begins at optional step 712, where a wireless receiver obtains a value of a length N for an orthogonal cover code. For example, wireless device 110 may receive signaling (e.g., DCI) from network node 120 informing wireless device 110 that network node 120 is transmitting CPE-RS generated from a length-2 OCC. In other embodiments, the length N may be predetermined or wireless device 110 may be preconfigured with length N.

At step 714, the wireless receiver receives a first symbol of a wireless signal. The first symbol may comprise a code division multiplexed DM-RS multiplexed with a length M orthogonal cover code; and a first code division multiplexed CPE-RS multiplexed with a length N orthogonal cover code, wherein N is less than or equal to M. For example, wireless device 110 may receive a first OFDM symbol, such as the third OFDM symbol illustrated in grid 41 of FIG. 4 (i.e., the symbol 12 that contains DM-RS 24). In that example, DM-RS 24 is code division multiplexed in the frequency domain using, for example, a length-4 OCC. The same OFDM symbol includes CPE-RS 44 and 46 multiplexed in the frequency domain using a length-2 OCC. Other embodiments may use any suitable value of N and M for OCC.

At step 716, the wireless receiver determines M code points in the first symbol associated with a DM-RS. For example, wireless device 110 determines four code points associated with DM-RS 24 illustrated in grid 41 of FIG. 4.

At step 718, the wireless receiver estimates a channel corresponding to the received wireless signal using the M code points associated with the DM-RS. For example wireless device 110 estimates a channel associated with the wireless signal received from network node 120 based on the received DM-RS.

At step 720, the wireless device estimates a first CPE-RS corresponding to the estimated channel using the first N code points of the M code points associated with the DM-RS. For example, wireless device 110 determines two code points associated with CPE-RS 24 illustrated in grid 41 of FIG. 4 (i.e., the intersection of DM-RS 24 and CPE-RS 44 and 46. Wireless device 110 uses these two code points to estimate the CPE-RS.

At step 722, the wireless device compensates the estimated channel for phase error using the estimated first CPE-RS. For example, wireless device 110 uses the CPE-RS to modify the channel estimated using the DM-RS in step 718 to account for phase error.

At optional step 724, the wireless device receives a second symbol of the wireless signal. In particular embodiments, the second symbol comprises a second code division multiplexed CPE-RS multiplexed with the length N orthogonal cover code. For example, wireless device 110 may receive a second OFDM symbol, such as the fourth OFDM symbol illustrated in grid 41 of FIG. 4 (or any symbol 12 other than the third OFDM symbol that contains DM-RS 24).

At optional step 726, the wireless device determines the resource elements in the second symbol that corresponding to resource elements in the first symbol comprising the first N code points of the M code points associated with the DM-RS. For example, wireless device 110 determines the time/frequency resources 22 that include CPE-RS in the fourth OFDM symbol illustrated in grid 41 of FIG. 4.

At optional step 728, the wireless device estimates a second CPE-RS corresponding to the estimated channel using the determined resource elements in the second symbol. For example, wireless device 110 determines a second CPE-RS based on the resource elements determined in the previous step 726.

At optional step 730, the wireless device compensates the estimated channel for phase error using the estimated second CPE-RS. For example, wireless device 110 compensates the channel estimated at previous step 718 for phase error using the second CPE-RS.

Modifications, additions, or omissions may be made to the method of FIG. 7. Additionally, one or more steps in the method of FIG. 7 may be performed in parallel or in any suitable order. The method may be repeated as necessary over time. Although the examples describe a downlink from a network node to a wireless device, other embodiments apply to an uplink from a wireless device to a network node.

Figure 8:
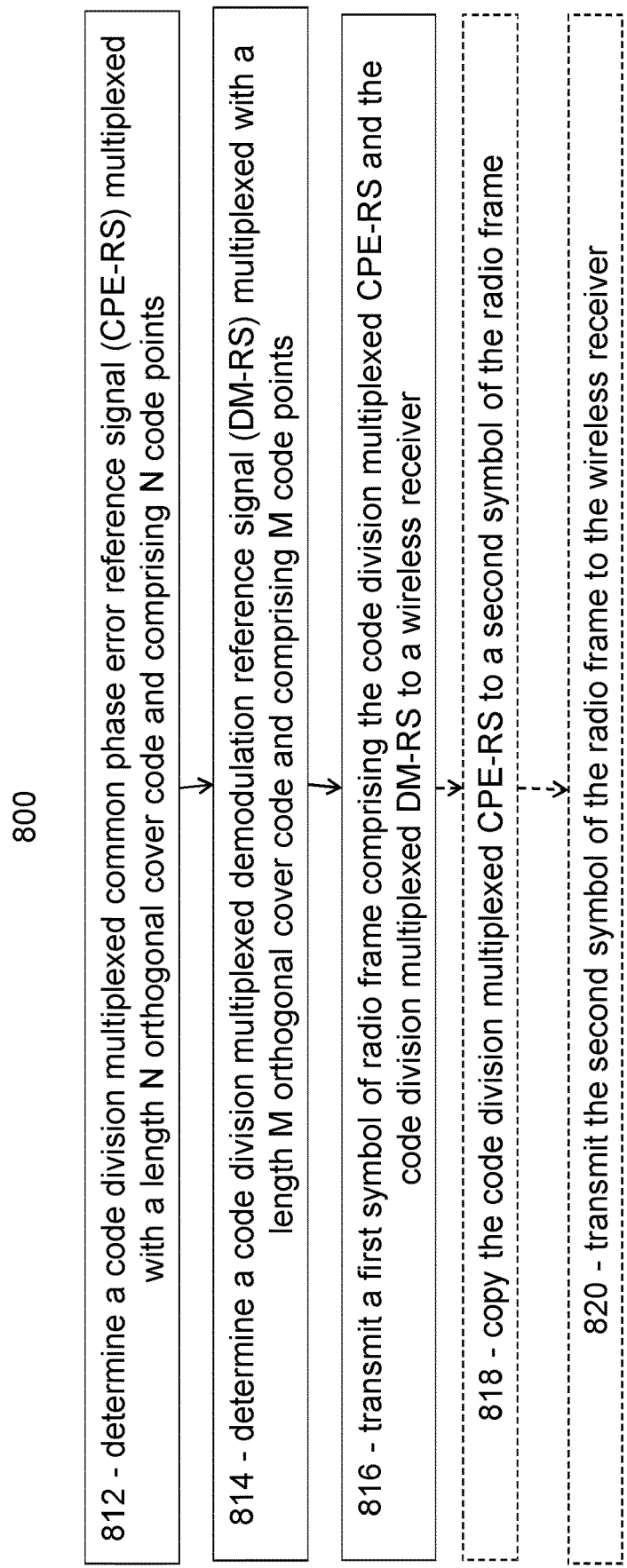
FIG. 8 is a flowchart of an example method in a wireless transmitter of transmitting a common phase error reference signal (CPE-RS), according to some embodiments.

FIG. 8 is a flowchart of an example method in a wireless transmitter of transmitting a common phase error reference signal (CPE-RS), according to some embodiments. In particular embodiments, one or more steps of the method may be performed by components of network 100 described with reference to FIG. 3.

The method begins at step 812, where a wireless transmitter determines a code division multiplexed CPE-RS multiplexed with a length N orthogonal cover code and comprising N code points. For example, network node 120 may determine at least one of CPE-RS 44 and 46 illustrated in grid 41 of FIG. 4 using a length-2 OCC.

At step 814, the wireless transmitter determines a code division multiplexed DM-RS multiplexed with a length M orthogonal cover code and comprising M code points, wherein M is greater than or equal to N and a first N code points of the DM-RS are generated from the CPE-RS. For example, network node 120 may determine DM-RS 24 illustrated in grid 41 of FIG. 4 using a length-4 OCC. Other embodiments may use any suitable value of N and M.

At step 816, the wireless transmitter transmits a first symbol of a radio frame comprising the code division multiplexed CPE-RS and the code division multiplexed DM-RS to a wireless receiver. For example network node may transmit the third OFDM symbol 12 illustrated in grid 41 of FIG. 4 (i.e., the symbol 12 that contains DM-RS 24).

At optional step 818, the wireless transmitter copies the code division multiplexed CPE-RS to a second symbol of the radio frame. For example, network node 120 copies the values of the two time/frequency resources 22 in the third OFDM symbol 12 illustrated in grid 41 of FIG. 4 at the intersection of DM-RS 24 and CPE-RS 44 and 46 to the same time/frequency resources in any of the remaining OFDM symbols 12 in grid 41.

At optional step 820, the wireless transmitter transmits the second symbol of the radio frame to the wireless receiver. For example, network node 120 transmits the fourth OFDM symbol 12 illustrated in grid 41 of FIG. 4 to wireless device 110.

Modifications, additions, or omissions may be made to the method of FIG. 8. Additionally, one or more steps in the method of FIG. 8 may be performed in parallel or in any suitable order. The method may be repeated as necessary over time. Although the examples describe a downlink from a network node to a wireless device, other embodiments apply to an uplink from a wireless device to a network node.

Figure 9B:
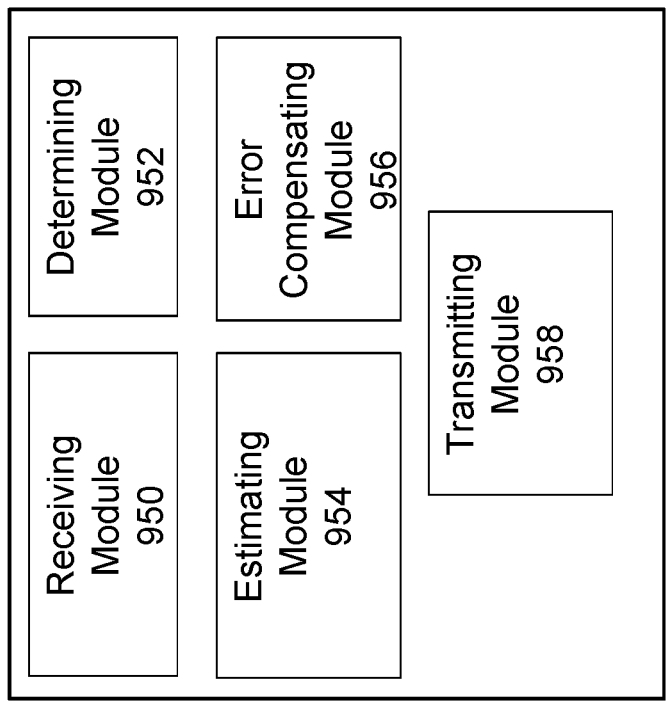
FIG. 9B is a block diagram illustrating example components of a wireless device.
Figure 9A:
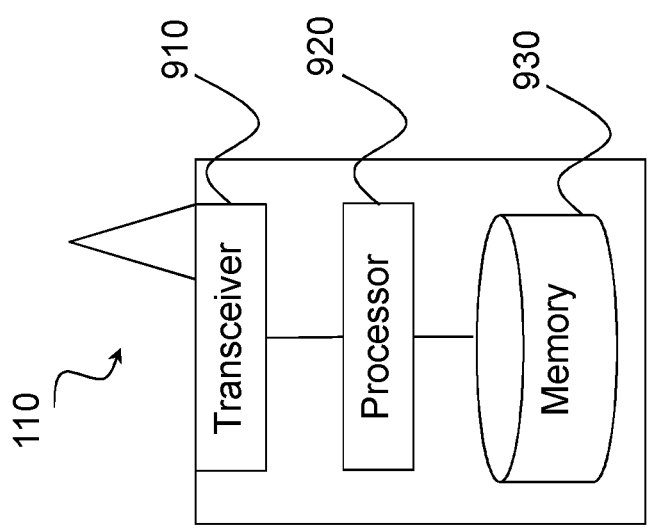
FIG. 9A is a block diagram illustrating an example embodiment of a wireless device.

FIG. 9A is a block diagram illustrating an example embodiment of a wireless device. The wireless device is an example of the wireless device 110 illustrated in FIG. 3.

The wireless device is capable of receiving a first symbol of a wireless signal comprising a code division multiplexed DM-RS a code division multiplexed CPE-RS. The wireless device is operable to determine code points in the first symbol associated with a DM-RS and estimate a channel corresponding to the received wireless signal using the code points. The wireless device is also operable to estimate a first CPE-RS corresponding to the estimated channel using the first N code points of code points associated with the DM-RS and compensating the estimated channel for phase error using the estimated first CPE-RS.

The wireless device is capable of determining a code division multiplexed CPE-RS multiplexed with a length N orthogonal cover code and determining a code division multiplexed DM-RS multiplexed with a length M orthogonal cover code a first N code points of the DM-RS are generated from the CPE-RS. The wireless device is operable to transmit a first symbol of a radio frame comprising the code division multiplexed CPE-RS and the code division multiplexed DM-RS to a wireless receiver.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 910, processor 920, and memory 930. In some embodiments, transceiver 910 facilitates transmitting wireless signals to and receiving wireless signals from wireless network node 120 (e.g., via an antenna), processor 920 executes instructions to provide some or all of the functionality described herein as provided by the wireless device, and memory 930 stores the instructions executed by processor 920.

Processor 920 includes any suitable combination of hardware and software implemented in one or more integrated circuits or modules to execute instructions and manipulate data to perform some or all of the described functions of the wireless device. In some embodiments, processor 920 may include, for example, one or more computers, one more programmable logic devices, one or more central processing units (CPUs), one or more microprocessors, one or more applications, and/or other logic, and/or any suitable combination of the preceding. Processor 920 may include analog and/or digital circuitry configured to perform some or all of the described functions of wireless device 110. For example, processor 920 may include resistors, capacitors, inductors, transistors, diodes, and/or any other suitable circuit components.

Memory 930 is generally operable to store computer executable code and data. Examples of memory 730 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

In particular embodiments, processor 920 in communication with transceiver 910 transmits and receives code division multiplexed reference signals, such as DM-RS and CPE-RS.

Other embodiments of the wireless device may include additional components (beyond those shown in FIG. 9A) responsible for providing certain aspects of the wireless device's functionality, including any of the functionality described above and/or any additional functionality (including any functionality necessary to support the solution described above).

FIG. 9B is a block diagram illustrating example components of a wireless device 110. The components may include receiving module 950, determining module 952, estimating module 954, error compensating module 956, and transmitting module 958.

Receiving module 950 may perform the receiving functions of wireless device 110. For example, receiving module 950 may receive a length-N from network node 120. Receiving module 950 may receive a wireless signal from network node 120 that includes code division multiplexed reference signals, such as DM-RS and CPE-RS. In certain embodiments, receiving module 950 may include or be included in processor 920. Receiving module 950 may include circuitry configured to receive radio signals. In particular embodiments, receiving module 950 may communicate with determining module 952, estimating module 954, error compensating module 956, and transmitting module 958.

Determining module 952 may perform the determining functions of wireless device 110. For example, determining module 952 may determine a code division multiplexed CPE-RS multiplexed with a length N orthogonal cover code and comprising N code points, and determine a code division multiplexed DM-RS multiplexed with a length M orthogonal cover code and comprising M code points, wherein M is greater than or equal to N and a first N code points of the DM-RS are generated from the CPE-RS. In some embodiments, determining module 952 may determine M code points associated with a DM-RS. In certain embodiments, determining module 952 may include or be included in processor 920. In particular embodiments, determining module 952 may communicate with receiving module 950, estimating module 954, error compensating module 956, and transmitting module 958.

Estimating module 954 may perform the estimating functions of wireless device 110. For example, estimating module 954 may estimate a wireless channel using a DM-RS and may estimate a CPE-RS using code points associated with the DM-RS. In certain embodiments, estimating module 954 may include or be included in processor 920. In particular embodiments, estimating module 954 may communicate with receiving module 950, determining module 952, error compensating module 956, and transmitting module 958.

Error compensating module 956 may perform the error compensating functions of wireless device 110. For example, error compensating module 956 may compensate an estimated channel for phase error based on a CPE-RS. In certain embodiments, error compensating module 956 may include or be included in processor 920. In particular embodiments, error compensating module 956 may communicate with receiving module 950, determining module 952, estimating module 954, and transmitting module 958.

Transmitting module 958 may perform the transmitting functions of wireless device 110. For example, transmitting module 958 may transmit a radio frame comprising a code division multiplexed CPE-RS and a code division multiplexed DM-RS. In certain embodiments, transmitting module 958 may include or be included in processor 920. Transmitting module 958 may include circuitry configured to transmit radio signals. In particular embodiments, transmitting module 958 may communicate with obtaining module 950, requesting module 952, receiving module 954, and error compensating module 956.

Figure 10B:
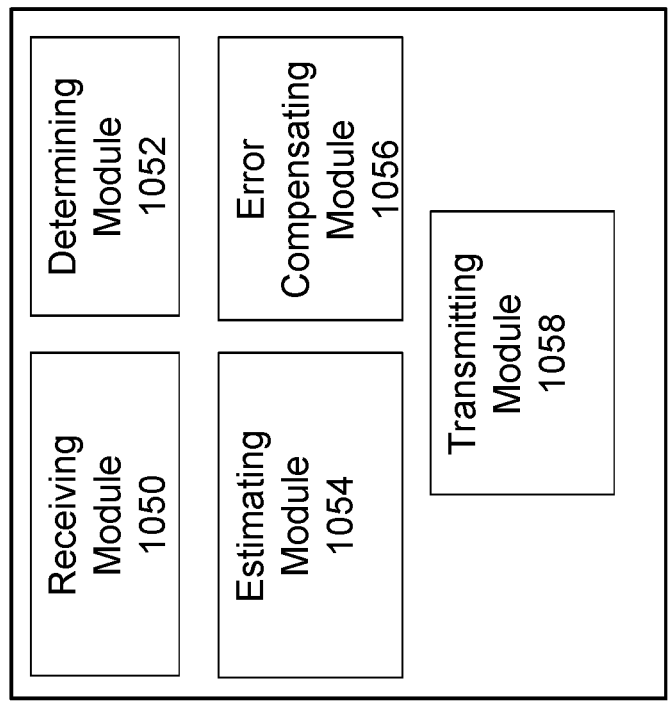
FIG. 10B is a block diagram illustrating example components of a network node.
Figure 10A:
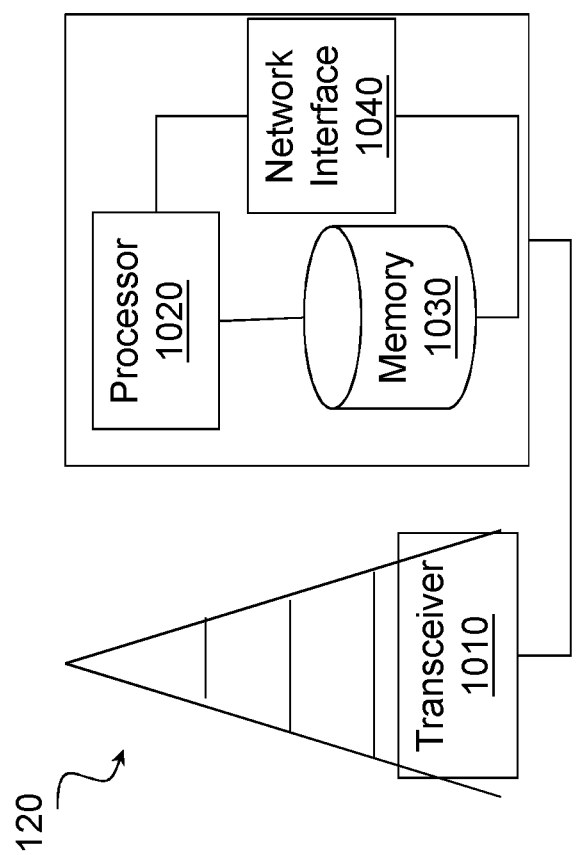
FIG. 10A is a block diagram illustrating an example embodiment of a network node.

FIG. 10A is a block diagram illustrating an example embodiment of a network node. The network node is an example of the network node 120 illustrated in FIG. 3. The network node is capable of receiving a first symbol of a wireless signal comprising a code division multiplexed DM-RS a code division multiplexed CPE-RS. The network node is operable to determine code points in the first symbol associated with a DM-RS and estimate a channel corresponding to the received wireless signal using the code points. The network node is also operable to estimate a first CPE-RS corresponding to the estimated channel using the first N code points of code points associated with the DM-RS and compensating the estimated channel for phase error using the estimated first CPE-RS.

The network node is capable of determining a code division multiplexed CPE-RS multiplexed with a length N orthogonal cover code and determining a code division multiplexed DM-RS multiplexed with a length M orthogonal cover code a first N code points of the DM-RS are generated from the CPE-RS. The network node is operable to transmit a first symbol of a radio frame comprising the code division multiplexed CPE-RS and the code division multiplexed DM-RS to a wireless receiver.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. Network node 120 includes at least one transceiver 1010, at least one processor 1020, at least one memory 1030, and at least one network interface 1040. Transceiver 1010 facilitates transmitting wireless signals to and receiving wireless signals from a wireless device, such as wireless devices 110 (e.g., via an antenna); processor 1020 executes instructions to provide some or all of the functionality described above as being provided by a network node 120; memory 1030 stores the instructions executed by processor 1020; and network interface 1040 communicates signals to backend network components, such as a gateway, switch, router, Internet, Public Switched Telephone Network (PSTN), controller, and/or other network nodes 120. Processor 1020 and memory 1030 can be of the same types as described with respect to processor 920 and memory 930 of FIG. 9A above.

In some embodiments, network interface 1040 is communicatively coupled to processor 1020 and refers to any suitable device operable to receive input for network node 120, send output from network node 120, perform suitable processing of the input or output or both, communicate to other devices, or any combination of the preceding. Network interface 1040 includes appropriate hardware (e.g., port, modem, network interface card, etc.) and software, including protocol conversion and data processing capabilities, to communicate through a network.

In particular embodiments, processor 1020 in communication with transceiver 1010 transmits and receives code division multiplexed reference signals, such as DM-RS and CPE-RS.

Other embodiments of network node 120 include additional components (beyond those shown in FIG. 10) responsible for providing certain aspects of the network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

FIG. 10B is a block diagram illustrating example components of a network node 120. The components may include receiving module 1050, determining module 1052, estimating module 1054, error compensating module 1056, and transmitting module 1058.

Receiving module 1050 may perform the receiving functions of network node 120. For example, receiving module 1050 may receive a length-N from wireless device 110. Receiving module 1050 may receive a wireless signal from wireless device 110 that includes code division multiplexed reference signals, such as DM-RS and CPE-RS. In certain embodiments, receiving module 1050 may include or be included in processor 1020. Receiving module 1050 may include circuitry configured to receive radio signals. In particular embodiments, receiving module 1050 may communicate with determining module 1052, estimating module 1054, error compensating module 1056, and transmitting module 1058.

Determining module 1052 may perform the determining functions of network node 120. For example, determining module 1052 may determine a code division multiplexed CPE-RS multiplexed with a length N orthogonal cover code and comprising N code points, and determine a code division multiplexed DM-RS multiplexed with a length M orthogonal cover code and comprising M code points, wherein M is greater than or equal to N and a first N code points of the DM-RS are generated from the CPE-RS. In some embodiments, determining module 1052 may determine M code points associated with a DM-RS. In certain embodiments, determining module 1052 may include or be included in processor 1020. In particular embodiments, determining module 1052 may communicate with receiving module 1050, estimating module 1054, error compensating module 1056, and transmitting module 1058.

Estimating module 1054 may perform the estimating functions of network node 120. For example, estimating module 1054 may estimate a wireless channel using a DM-RS and may estimate a CPE-RS using code points associated with the DM-RS. In certain embodiments, estimating module 1054 may include or be included in processor 1020. In particular embodiments, estimating module 1054 may communicate with receiving module 1050, determining module 1052, error compensating module 1056, and transmitting module 1058.

Error compensating module 1056 may perform the error compensating functions of network node 120. For example, error compensating module 1056 may compensate an estimated channel for phase error based on a CPE-RS. In certain embodiments, error compensating module 1056 may include or be included in processor 1020. In particular embodiments, error compensating module 1056 may communicate with receiving module 1050, determining module 1052, estimating module 1054, and transmitting module 1058.

Transmitting module 1058 may perform the transmitting functions of network node 120. For example, transmitting module 1058 may transmit a radio frame comprising a code division multiplexed CPE-RS and a code division multiplexed DM-RS. In certain embodiments, transmitting module 1058 may include or be included in processor 1020. Transmitting module 1058 may include circuitry configured to transmit radio signals. In particular embodiments, transmitting module 1058 may communicate with obtaining module 1050, requesting module 1052, receiving module 1054, and error compensating module 1056.

Some embodiments of the disclosure may provide one or more technical advantages. As an example, in some embodiments, the methods and apparatus disclosed herein may improve CPE-RS resource utilization compared to conventional solutions. Full utilization of all sub-carriers is possible for DMRS while utilizing code-domain for the CPE-RS extraction. This improves processing gain for CPE tracking without the need for power boosting solutions (which are needed in conventional solutions to improve coverage). Thus, in particular embodiments the allocation of CPE-RS may not limit the maximum number of available DM-RS layers.

Another advantage is improved support for extended common phase noise tracking in MU-MIMO operations and in CoMP deployments with multiple transmission points. Furthermore, particular embodiments use marginal additional signaling for configuring CPE-RS. Particular embodiments facilitate a flexible configuration of a longer length DMRS-OCC and a shorter length CPE-OCC at the same time. Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3 GPP 3rd Generation Partnership Project
CDM Code Division Multiplexing
CDMA2000 Code division multiple access 2000
CoMP Coordinated Multipoint
CP Cyclic Prefix
CPE-RS Common Phase Error Reference Signal
CRS Cell-Specific Reference Signal
DM-RS Demodulation Reference Signal
eNB Enhanced Node-B
ePDCCH Enhance Physical Downlink Control Channel
FDD Frequency Division Duplex
FDM Frequency Division Multiplexing
GSM Global System for Mobile communication
HSPA High Speed Packet Access
LTE Long Term Evolution
MIMO Multi-Input Multi-Output
MU-MIMO Multi-User MIMO
OCC Orthogonal Cover Code
OFDM Orthogonal Frequency-Division Multiplexing
PA Power Amplifier
PBCH Physical Broadcast Channel
PCFICH Physical Control Format Indicator Channel
PDCCH Physical Downlink Control Channel
PDCH Physical Data Channel
PDSCH Physical Downlink Shared Channel
ppm Part Per Million
PSS Primary Synchronization Signal
RS Reference Signal
SSS Secondary Synchronization Signal
TDD Time Division Duplexing
UE User Equipment
UMTS Universal Mobile Telecommunications System
WiMAX Worldwide Interoperability for Microwave Access

The invention claimed is:

1. A method in a wireless receiver of compensating common phase error in a received wireless signal, the method comprising:
obtaining a value of a length N;
receiving, from a wireless transmitter, a first symbol of a wireless signal, the first symbol comprising:
a code division multiplexed demodulation reference signal (DM-RS) multiplexed with a length M orthogonal cover code; and
a first code division multiplexed common phase error reference signal (CPE-RS) multiplexed with a length N orthogonal cover code, wherein N is less than or equal to M;
determining M code points in the first symbol associated with the code division multiplexed DM-RS;

estimating a channel corresponding to the received wireless signal using the M code points associated with the code division multiplexed DM-RS;

estimating a first CPE-RS corresponding to the estimated channel using first N code points of the M code points associated with the code division multiplexed DM-RS;

compensating the estimated channel for phase error using the estimated first CPE-RS;

receiving, from the wireless transmitter, a second symbol of the wireless signal, the second symbol comprising a second code division multiplexed CPE-RS multiplexed with the length N orthogonal cover code; and determining resource elements in the second symbol corresponding to resource elements in the first symbol comprising the first N code points of the M code points associated with the code division multiplexed DM-RS.

2. The method of claim 1, wherein obtaining the value of the length N comprises receiving the value of the length N value in downlink control information (DCI).

3. The method of claim 1, wherein the first symbol comprises an orthogonal frequency division multiplexed (OFDM) symbol.

4. The method of claim 1, wherein each of the length N orthogonal cover code and the length M orthogonal cover code comprises one of a Walsh-Hadamard code or a Discrete Fourier Transform (DFT) code.

5. A method in a wireless transmitter of transmitting a common phase error reference signal, the method comprising:

transmitting a value of a length N to a wireless receiver;

determining a first code division multiplexed common phase error reference signal (CPE-RS) multiplexed with a length N orthogonal cover code and comprising N code points;

determining a code division multiplexed demodulation reference signal (DM-RS) multiplexed with a length M orthogonal cover code and comprising M code points, wherein M is greater than or equal to N and first N code points of the code division multiplexed DM-RS are generated from the first code division multiplexed CPE-RS;

transmitting a first symbol of a radio frame comprising the first code division multiplexed CPE-RS and the code division multiplexed DM-RS to the wireless receiver; and copying the first code division multiplexed CPE-RS to a second symbol of the radio frame, the second symbol comprising a second code division multiplexed CPE-RS multiplexed with the length N orthogonal cover code.

6. The method of claim 5, wherein transmitting the value of the length N comprises transmitting the value in downlink control information (DCI).

7. The method of claim 5, wherein the first symbol comprises an orthogonal frequency division multiplexed (OFDM) symbol.

8. The method of claim 5, wherein each of the length N orthogonal cover code and the length M orthogonal cover code comprises one of a Walsh-Hadamard code or a Discrete Fourier Transform (DFT) code.

9. The method of claim 5, further comprising:

transmitting the second symbol of the radio frame to the wireless receiver.

10. A wireless receiver operable to compensate for common phase error in a received wireless signal, the wireless receiver comprising a processor and a memory, the processor being operable to:

obtain a value of a length N;

receive, from a wireless transmitter, a first symbol of a wireless signal, the first symbol comprising:

a code division multiplexed demodulation reference signal (DM-RS) multiplexed with a length M orthogonal cover code; and a first code division multiplexed common phase error reference signal (CPE-RS) multiplexed with a length N orthogonal cover code, wherein N is less than or equal to M;

determine M code points in the first symbol associated with the code division multiplexed DM-RS;

estimate a channel corresponding to the received wireless signal using the M code points associated with the code division multiplexed DM-RS;

estimate a first CPE-RS corresponding to the estimated channel using first N code points of the M code points associated with the code division multiplexed DM-RS;

compensate the estimated channel for phase error using the estimated first CPE-RS;

receive, from the wireless transmitter, a second symbol of the wireless signal, the second symbol comprising a second code division multiplexed CPE-RS multiplexed with the length N orthogonal cover code; and determine resource elements in the second symbol corresponding to resource elements in the first symbol comprising the first N code points of the M code points associated with the code division multiplexed DM-RS.

11. The wireless receiver of claim 10, wherein the processor is operable to receive the value of the length N value in downlink control information (DCI).

12. The wireless receiver of claim 10, wherein the first symbol comprises an orthogonal frequency division multiplexed (OFDM) symbol.

13. The wireless receiver of claim 10, wherein each of the length N orthogonal cover code and the length M orthogonal cover code comprises one of a Walsh-Hadamard code or a Discrete Fourier Transform (DFT) code.

14. The wireless receiver of claim 10, the processor further being operable to:

estimate a second CPE-RS corresponding to the estimated channel using the determined resource elements in the second symbol; and compensate the estimated channel for phase error using the estimated second CPE RS.

15. A wireless transmitter operable to transmit a common phase error reference signal, the wireless transmitter comprising a processor and a memory, the processor being operable to:

transmit a value of a length N to a wireless receiver;

determine a first code division multiplexed common phase error reference signal (CPE-RS) multiplexed with a length N orthogonal cover code and comprising N code points;

determine a code division multiplexed demodulation reference signal (DM-RS) multiplexed with a length M orthogonal cover code and comprising M code points, wherein M is greater than or equal to N and first N code points of the code division multiplexed DM-RS are generated from the first code division multiplexed CPE-RS;

transmit a first symbol of a radio frame comprising the first code division multiplexed CPE-RS and the code division multiplexed DM-RS to the wireless receiver; and copy the first code division multiplexed CPE-RS to a second symbol of the radio frame, the second symbol comprising a second code division multiplexed CPE-RS multiplexed with the length N orthogonal cover code.

16. The wireless transmitter of claim 15, wherein the processor transmits the value of the length N in downlink control information (DCI).

17. The wireless transmitter of claim 15, wherein the first symbol comprises an orthogonal frequency division multiplexed (OFDM) symbol.

18. The wireless transmitter of claim 15, wherein each of the length N orthogonal cover code and the length M orthogonal cover code comprises one of a Walsh-Hadamard code or a Discrete Fourier Transform (DFT) code.

* * * * *